Oct. 23, 1923.
J. A. LEWELLYN
1,472,024
WIRE ENAMELING MACHINE
Filed Aug. 11, 1919      5 Sheets-Sheet 1
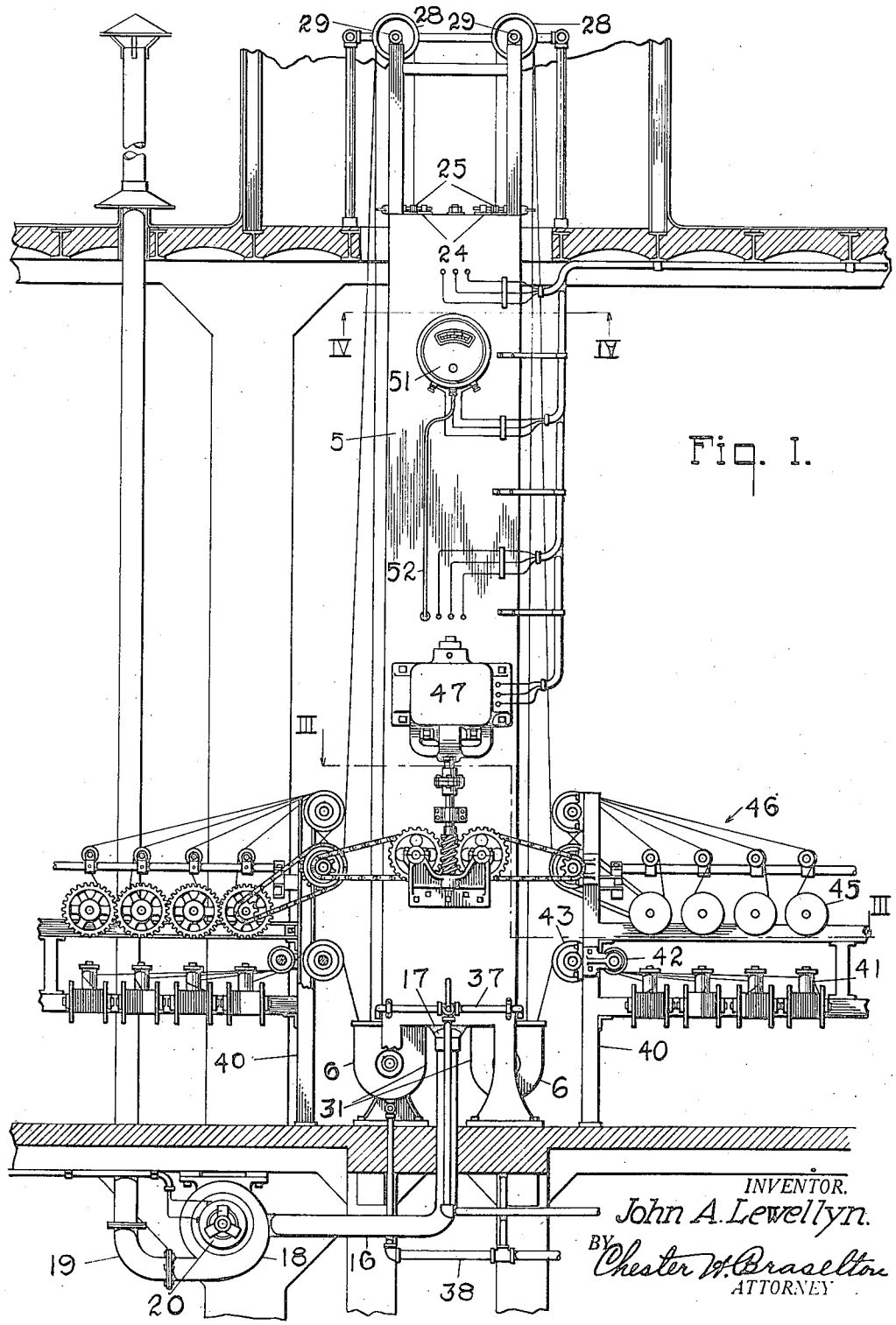
Fig. I.
INVENTOR.
John A. Lewellyn.
BY Chester W. Braselton
ATTORNEY

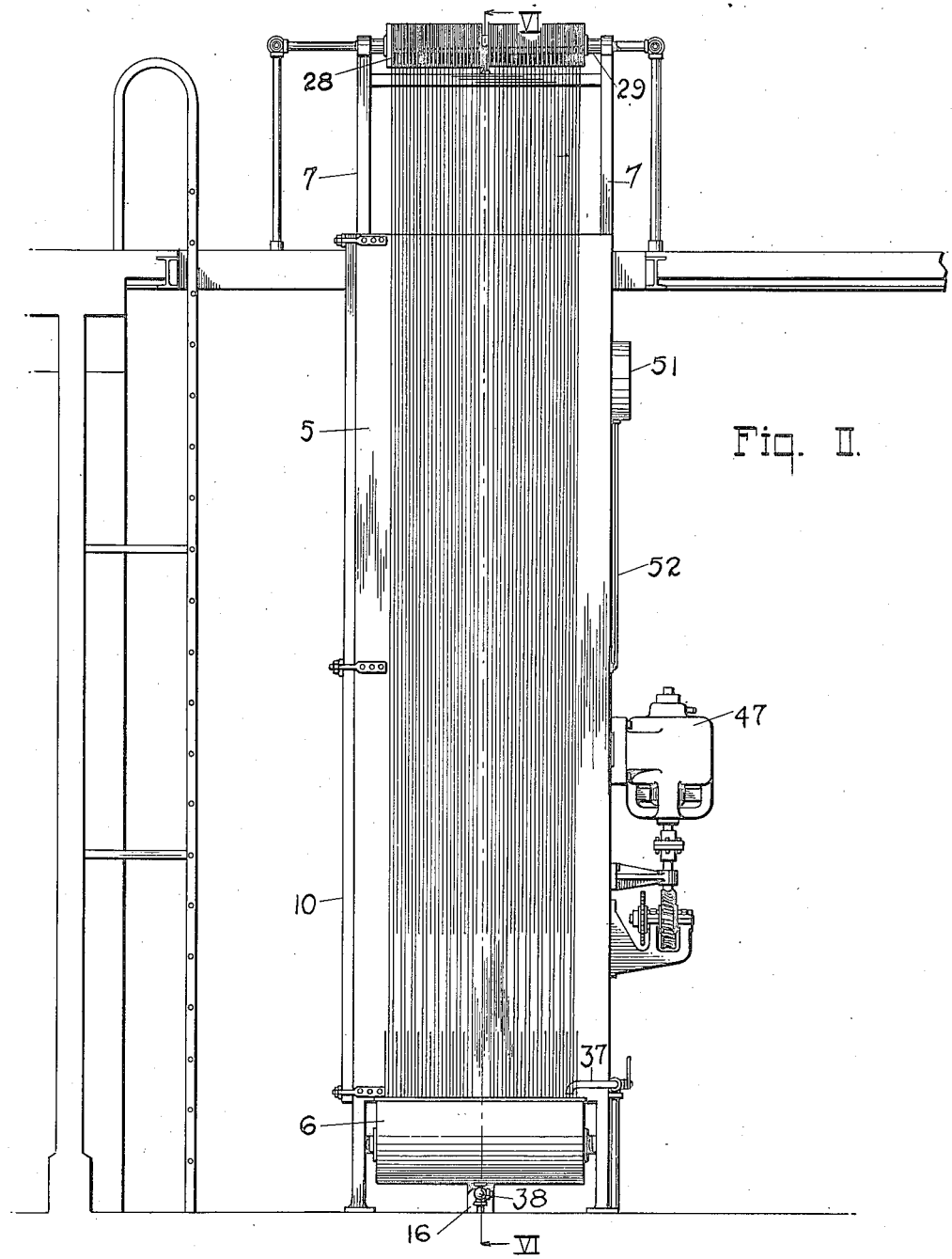

Oct. 23, 1923.  
J. A. LEWELLYN  
WIRE ENAMELING MACHINE  
Filed Aug. 11, 1919  
1,472,024  
5 Sheets-Sheet 3
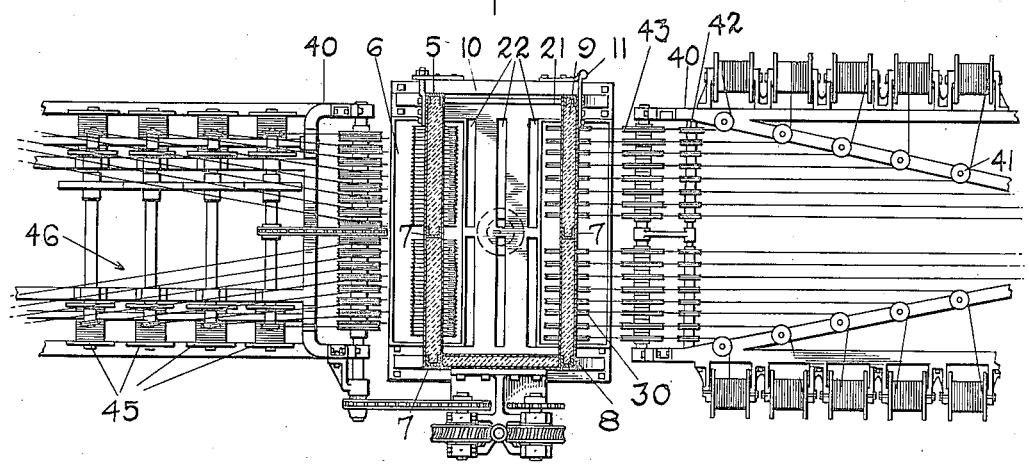
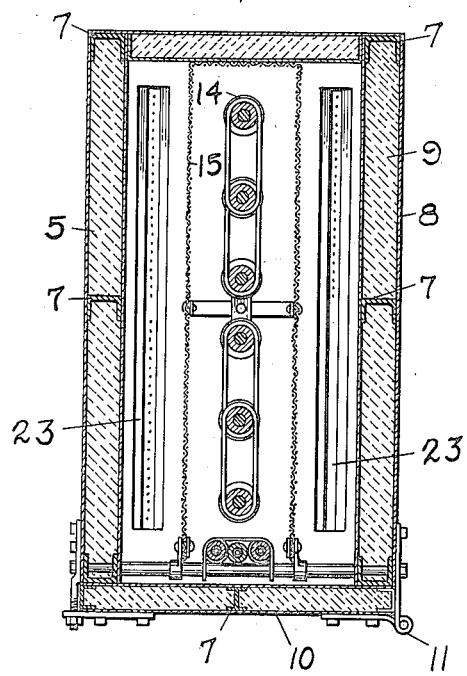
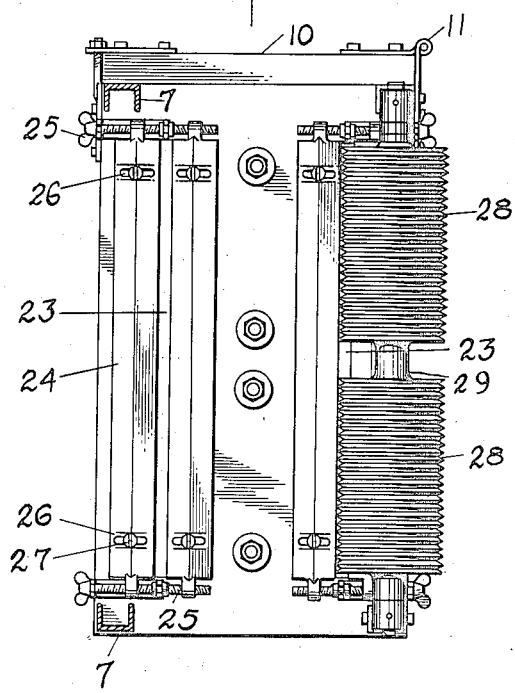
INVENTOR.  
John A. Lewellyn.  
BY Chester W. Braselton  
ATTORNEY

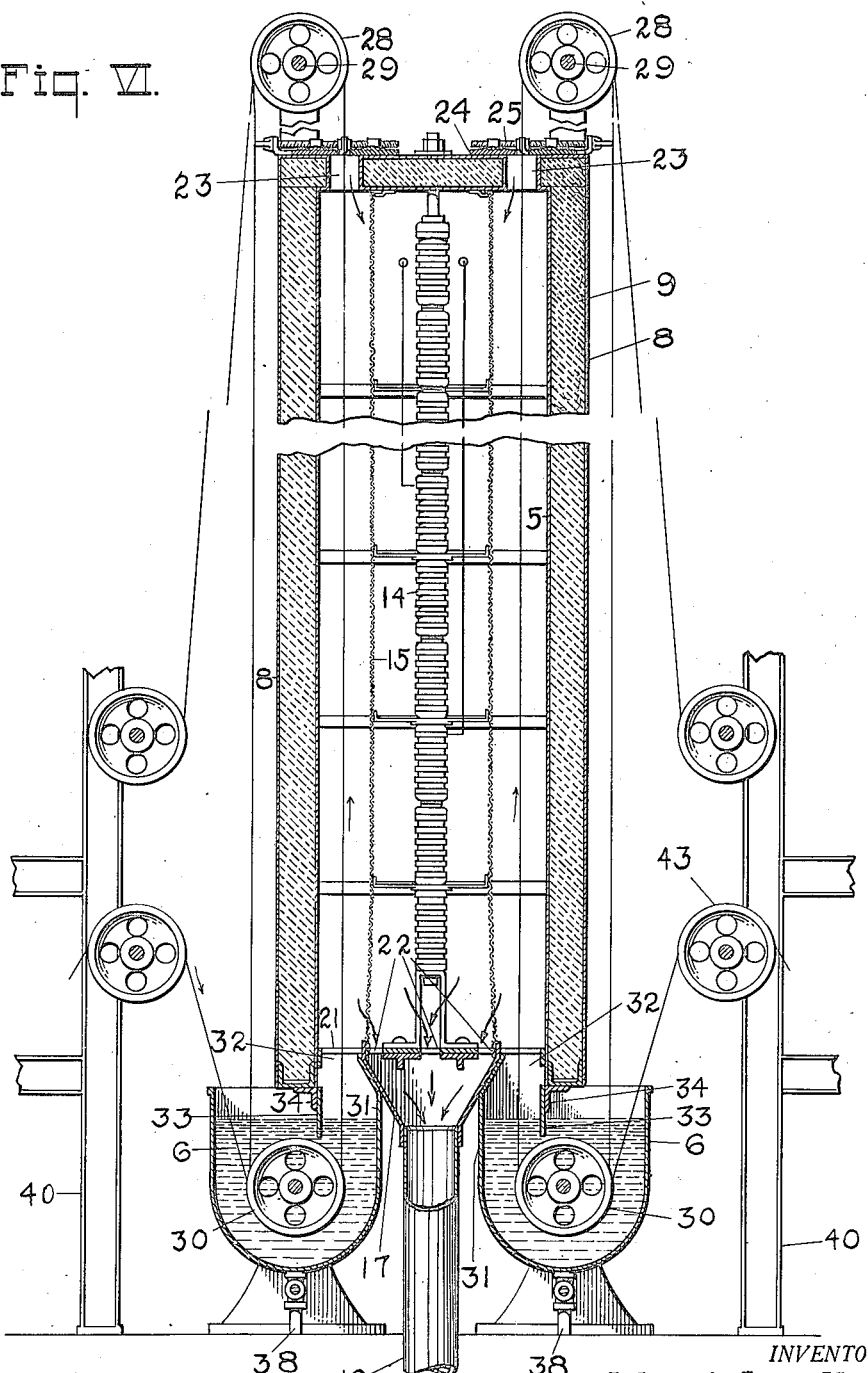

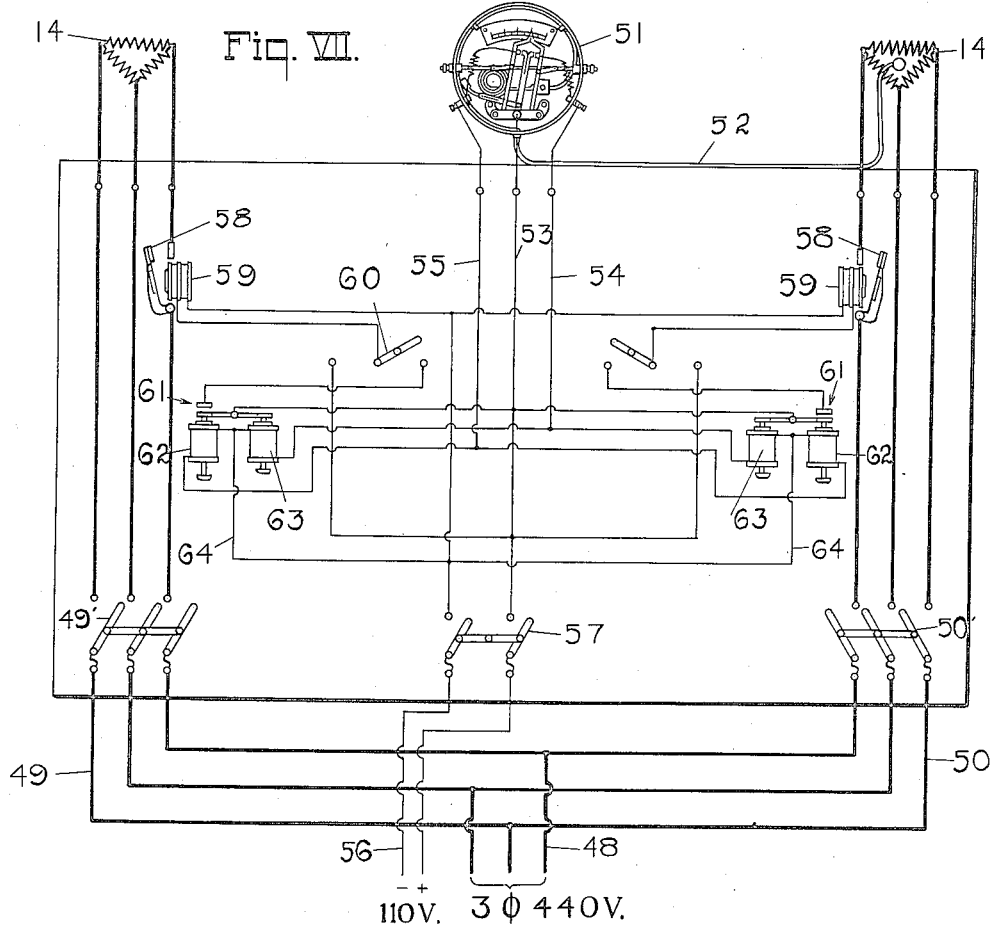

Patented Oct. 23, 1923.

1,472,024

UNITED STATES PATENT OFFICE.

JOHN A. LEWELLYN, OF TOLEDO, OHIO.

WIRE-ENAMELING MACHINE.

Application filed August 11, 1919. Serial No. 316,810.

*To all whom it may concern:*

Be it known that I, JOHN A. LEWELLYN, a citizen of the United States, residing at Toledo, in the county of Lucas and State of Ohio, have invented certain new and useful Improvements in Wire-Enameling Machines, of which I declare the following to be a full, clear, and exact description.

This invention relates to machines for applying and subsequently baking a coat of enamel on wire.

An object of my invention is to provide a machine for applying an even coat of enamel to wire and subsequently subjecting it to a proper heat to harden the enamel, and for finally removing the coated wire from the heat before the enamel has become discolored or burned.

Another object is to provide for the gradual withdrawal under the control of the operator of the heated air together with the resulting smoke and fumes from within the oven, and for replacing the same with fresh air.

Another object is to prevent fresh air from entering the oven at a point where it would come into contact with the enamel before it has become hardened.

Another object is to provide facilities for keeping the temperature of the oven under complete control and for maintaining therein a substantially constant temperature.

Further objects of this invention relate to economies of manufacture and details of construction as will hereinafter appear from the detailed description to follow. I accomplish the objects of my invention in one instance by the devices and means described in the following specification, but it is evident that the same may be varied widely without departing from the scope of the invention as pointed out in the appended claims. A structure constituting one embodiment of my invention, which may be the preferred, is illustrated in the accompanying drawings forming a part hereof, in which:

Figure I is a front elevation of the machine.

Fig. II is a side elevation of the same.

Fig. III is a cross sectional view taken on the line III—III of Fig. I.

Fig. IV is a cross sectional view on a larger scale taken on the line IV—IV of Fig. I.

Fig. V is a top plan view on a larger scale.

Fig. VI is a cross sectional view on a larger scale taken on the line VI—VI of Fig. II, a portion being broken away, and Fig. VII is a circuit diagram.

In the drawings, similar reference numerals refer to similar parts throughout the several views, and the sectional views are taken looking in the direction of the arrows at the ends of the section lines.

According to the invention the wire to be enameled is slowly passed around a pulley immersed in a vat of liquid enamel where it receives a uniform coat and immediately passes up into an oven heated to the proper degree for the oxidation or hardening of the enamel. By the time the coated wire reaches the top of the oven where it emerges, the coat of enamel is completely hardened and the wire is then passed over a pulley and down into the vat for a second coat or, if a single coat only is desired, the wire may be wound immediately upon a spool.

On account of the high temperature within the oven there would be a natural circulation of air there through, fresh air entering at the bottom and heated air together with fumes from the enamel leaving the oven at the top through the openings provided for the wire. This, however, is objectionable for the reason that dust particles carried by the entering air may become attached to the freshly coated wire before the enamel has begun to harden, the insulation properties of the enamel permitted to harden under such circumstances being seriously impaired. As the smoke and fumes given off by the enamel within the oven contain more or less of the enamel in a finely divided state, to permit these fumes to escape from the openings for the wire at the top of the oven results in a condensation upon the adjacent pulley over which the coated wire passes, the wire sticking to the pulley and the pulley soon becoming so coated as to require a shut down for the purpose of cleaning it. A further disadvantage of such an arrangement is that the fumes and smoke which are extremely disagreeable, if not poisonous, are thrown into the room to be breathed by the operators.

According to this invention an air pump is provided and connected by a pipe to the lower portion of the oven to withdraw the fumes and smoke which are carried outside the building, fresh air being permitted to enter only at the top of the oven through adjustable openings. Any dust particles carried in by the air entering at the top are burned up before they reach the wire on which the enamel has not yet hardened. Means is provided for preventing fresh air from entering the oven at the bottom by connecting the top of the enamel vat directly with the oven and extending a portion of the oven walls below the level of the enamel bath.

This machine may be said to comprise two principal parts, namely an oven 5 and a pair of enamel baths or vats 6. The oven 5 is constructed of channel irons 7 and plates 8 between which is a packing of asbestos 9, or other suitable heat insulating material. A door 10 hinged at 11, extending the full height of the oven, affords access thereto. The oven is shown heated by means of electrical heaters 14 connected to a three phase power circuit to be described subsequently. A wire screen 15 surrounds the heating elements and prevents any portion thereof from accidentally becoming dislodged and contacting with the coated wire. A pipe 16 having a flared mouth 17 connects the bottom of the oven with a motor driven centrifugal pump 18 whose outlet connects with a pipe 19 leading to the outside of the building. The motor 20 driving this pump is a variable speed motor connected with which are suitable means for varying the speed to suit the particular conditions. A plate 21 having three openings 22 extends across the mouth of the flared portion 17 through which openings the fumes, smoke and heated air of the oven are withdrawn. At the top of the oven two openings 23 are provided through which the coated wire emerges, these openings being partially closed by plates 24 whose distance apart may be adjusted by means of the adjusting screws 25. Each plate 24 has a pair of transverse slots 26 through which extends guide screws 27. The rows of separate pulleys 28 are mounted on the shafts 29 for individual movement thereon, each pulley being adapted to receive one strand of wire. Similar rows of pulleys 30 are located below the oven and within the vat of enamel 6. The two vats 6 for holding the liquid enamel are arranged beneath opposite walls of the oven and have their adjacent walls 31, as well as portions 32 of their ends walls extending up into the oven to touch the plate 21. An apron 33, secured to the under side of the oven by means of angle iron 34, projects into the liquid and is provided for the purpose of effecting a seal therewith. By the above structure it will be seen that as long as the liquid level is maintained at the proper height, that is, above the bottom of the apron 33, no air can enter the oven at its lower portion. In order to fill the vats a pipe and valve connection 37 is provided and a drain pipe 38 also is provided to facilitate drawing off the liquid enamel from the vats.

On each side of the machine there is shown a frame 40 carrying a series of spools of wire, the wire from each spool being guided by pulleys 41, 42 and 43 to the pulleys 30 within the enamel vats. Arranged above these spools are reels 45 and reeling apparatus denoted as a whole by 46 for guiding each strand of coated wire as it comes from the oven and winding it uniformly on the reels 45. This reeling apparatus is driven through a worm and chain drive by an electric motor 47, the speed of which and the gear ratio being so designed that the wire shall pass through the oven at the proper rate for complete hardening of the enamel, yet not sufficient to permit the enamel to become burned or discolored. Suitable controlling means is provided for varying the speed of the motor 47. The two electric heating units 14 of the oven are connected to a three phase 440 volt supply circuit 48, having two branches 49 and 50 which are controlled respectively by switches 49' and 50', illustrated diagrammatically by Fig. VII. These heating units are arranged in two groups and are shown connected in delta.

In order that the oven may be maintained at a uniform temperature and in order that the temperature may be varied at will to suit particular conditions, regulating apparatus is employed, now to be described. A thermally controlled contact device 51, such for example as a "Taylor contactor" having a mercury tube 52 extending to the interior of the oven, is connected to close a circuit from a common wire 53 to either one of two wires 54 or 55, energy being obtained from a 110 volt direct current supply circuit 56 and controlled by a switch 57. A single pole clapper switch 58, having a winding 59 is arranged to control one wire of each branch circuit to the heating units so that when the winding is unenergized the switch falls to open position. Inasmuch as the contact device 51 controls both branch power circuits through identical devices, the description will be limited to those devices for controlling the left hand branch circuit appearing in Fig. VII. In circuit with the winding 59 of switch 58 is a single pole, double throw switch 60 which when thrown to the left connects the winding directly with the supply circuit, while when thrown to the right connects it through a relay 61. This relay has two windings 62 and 63 which have a common terminal 64 leading to one side of the supply circuit, while their opposite terminals connect respectively with the two wires 54 and 55 of the contact device 52. The armature of relay 61 in one position closes the circuit to the winding 59 and opens the circuit in the other position. The contact device 52 may be set at any desired temperature which is to be maintained within the oven.

It will thus be seen that in operation, supposing the switches 58 to be closed, should the temperature in the oven become higher than that for which the contactor is set, the contactor will close the circuit between the wires 53 and 55, thereby energizing the coils 62 of relays 61, opening the circuits to the windings 59 whereby the switches 58 fall to open position. The circuit connections to the heating units 14 are thereby changed from three phase to single phase with the resulting diminution in the amount of heat delivered. When the temperature in the oven has fallen below the mark for which the contactor is set, and the same closes the circuit between the wire 53 and the wire 54 the winding 62 is de-energized and the winding 63 is energized to close the circuit to the winding 59 and thereby close the switch 58 to restore the three phase circuit connections to the heaters. If it is desired to eliminate the effect of the contactor the switch 60 may be thrown to the left, whereby the magnet 59 will be permanently energized to hold the switch 58 closed.

Experience has shown that with wires of various diameters, with enamels of different compositions and with changes in atmospheric conditions it is expedient to be able to readily change the degree of heat supplied to the oven, the velocity with which the wire travels through the oven during the oxidizing or hardening process, the speed of the exhausting fan and the size of the apertures through which fresh air is admitted. Within certain limits these factors are all individually and separately under the control of the operator, by the means and in the manner above described.

While I have described my invention in more or less detail, and as being embodied in certain precise forms I do not desire or intend to be limited thereto, as on the contrary my invention contemplates broadly all proper changes, as well as the omission of immaterial elements and the substitution of equivalents therefor, as circumstances may suggest or necessity render expedient.

Having thus described my invention, what I claim as new and desire to secure by Letters Patent, is:

1. In a device of the class described, the combination of an enamel bath, an oven adjacent thereto, means for heating said oven, means for causing wire to pass through said enamel bath and subsequently through said oven, means for withdrawing heated air and fumes from said oven and means for preventing contact of outside air with said wire intermediate said bath and oven.

2. In a device of the class described, the combination of an enamel bath, an oven adjacent thereto, means for heating said oven, means for causing wire to pass through said bath and said oven, means for withdrawing heated air and fumes from said oven and means for preventing contact of outside air with said wire intermediate said bath and oven.

3. In a device of the class described, the combination of an enamel bath, an oven adjacent thereto, means for heating said oven, means for causing wire to pass through said bath and oven, means for withdrawing air and fumes from said oven near the point of entrance of said wire and for permitting fresh air to enter near the point of exit thereof, and means for preventing the contact of outside air with said wire intermediate said bath and oven.

4. In a device of the class described, the combination of means for applying a coat of enamel to wire, an oven through which said wire is adapted to be passed, a pump for withdrawing air from said oven in the vicinity of the point of entrance of said wire, said oven having an opening to admit air at a point distant from said point of entrance and means for adjusting the size of said admission opening.

5. In a wire enameling machine, the combination of a receptacle for holding enamel, a baking oven over said receptacle having an opening in its bottom and a portion extending down into said receptacle forming a seal, means for causing wire to pass through said receptacle and up into said oven, a pump connected to said oven at its lower part for withdrawing air from said oven and means for admitting air to said oven at its upper part whereby there is a gradual change of air in said oven, but entering air cannot impinge upon the coated wire immediately upon entering the oven.

6. In a wire enameling machine, the combination of a receptacle for holding enamel, a baking oven mounted over and contiguous with said receptacle and having an apron extending down into the enamel whereby a seal is formed, a pulley located in said receptacle for guiding a wire down into the enamel under the apron and up into the oven, a pulley for the wire above said oven, reeling means for the wire, an adjustable opening for the wire in the top of said oven and means connected with the lower portion of the oven for removing air therefrom.

In testimony whereof, I affix my signature.

JOHN A. LEWELLYN.